(12) United States Patent
Yoo et al.

(10) Patent No.: US 10,836,898 B2
(45) Date of Patent: Nov. 17, 2020

(54) NON-HALOGEN FLAME RETARDANT RESIN COMPOSITION

(71) Applicant: LG CHEM, LTD., Seoul (KR)

(72) Inventors: Je Sun Yoo, Daejeon (KR); Ki Young Nam, Daejeon (KR); Yong Yeon Hwang, Daejeon (KR); Jae Young Sim, Daejeon (KR); Seon Hyeong Bae, Daejeon (KR); Jae Yeon Bae, Daejeon (KR); In Seok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/085,978

(22) PCT Filed: Oct. 26, 2017

(86) PCT No.: PCT/KR2017/011883
§ 371 (c)(1),
(2) Date: Sep. 17, 2018

(87) PCT Pub. No.: WO2018/088729
PCT Pub. Date: May 17, 2018

(65) Prior Publication Data
US 2019/0100647 A1 Apr. 4, 2019

(30) Foreign Application Priority Data

Nov. 10, 2016 (KR) .................. 10-2016-0149369
Aug. 24, 2017 (KR) .................. 10-2017-0107355

(51) Int. Cl.
| | | |
|---|---|---|
| *C08L 55/02* | (2006.01) |
| *C08L 51/04* | (2006.01) |
| *C08L 25/06* | (2006.01) |
| *C08K 3/32* | (2006.01) |
| *C08L 25/08* | (2006.01) |
| *C08L 71/12* | (2006.01) |
| *C08L 53/02* | (2006.01) |
| *C08K 5/00* | (2006.01) |
| *C08K 5/09* | (2006.01) |
| *C08K 5/098* | (2006.01) |
| *C08K 5/5333* | (2006.01) |

(52) U.S. Cl.
CPC .............. *C08L 55/02* (2013.01); *C08K 3/32* (2013.01); *C08L 25/06* (2013.01); *C08L 25/08* (2013.01); *C08L 51/04* (2013.01); *C08L 53/02* (2013.01); *C08L 71/12* (2013.01); *C08K 5/0066* (2013.01); *C08K 5/09* (2013.01); *C08K 5/098* (2013.01); *C08K 5/5333* (2013.01); *C08K 2201/019* (2013.01); *C08L 2201/02* (2013.01)

(58) Field of Classification Search
CPC .......... C08L 55/02; C08L 25/06; C08L 51/04; C08L 25/08; C08L 53/02; C08L 71/12; C08L 2201/02; C08K 3/32; C08K 5/09; C08K 5/0066; C08K 2201/019; C08K 5/098; C08K 5/5333
See application file for complete search history.

(56) References Cited

U.S. PATENT DOCUMENTS

| | | | | |
|---|---|---|---|---|
| 4,474,711 A * | 10/1984 | Kleiner | ............... | C07F 9/48 |
| | | | | 558/110 |
| 4,618,633 A | 10/1986 | Taubitz et al. | | |
| 7,339,001 B2 * | 3/2008 | Jang | ............... | C08F 279/02 |
| | | | | 524/508 |
| 2001/0044520 A1 * | 11/2001 | Suzuki | ............... | C08J 11/08 |
| | | | | 528/491 |
| 2009/0239991 A1 * | 9/2009 | Avtomonov | ............ | C08L 69/00 |
| | | | | 524/504 |
| 2013/0324647 A1 | 12/2013 | Decampo et al. | | |

FOREIGN PATENT DOCUMENTS

| | | |
|---|---|---|
| CN | 1359978 A | 7/2002 |
| CN | 105121547 A | 12/2015 |
| EP | 2857450 A1 | 4/2015 |
| JP | 2005523969 A | 8/2005 |
| JP | 2006176697 A | 7/2006 |
| JP | 2009503222 A | 1/2009 |
| KR | 100538826 B1 | 12/2005 |
| KR | 10-0602850 B1 | 7/2006 |
| KR | 10-0694980 B1 | 3/2007 |
| KR | 10-2013-0026520 A | 3/2013 |
| KR | 10-2013-0132004 A | 12/2013 |
| KR | 10-2014-0131652 A | 11/2014 |
| KR | 1020150038968 A | 4/2015 |
| WO | 03089513 A1 | 10/2003 |
| WO | 03091332 A1 | 11/2003 |
| WO | WO03091332 A1 | 11/2003 |
| WO | WO2007018340 A1 | 2/2007 |

OTHER PUBLICATIONS

European Patent Office Search Report for Application No. 17868566.5, dated Mar. 19, 2019.
International Search Report for PCT/KR2017/011883 filed on Oct. 26, 2017.
Office Action dated May 11, 2020 for Chinese Application 201780036906.0.

\* cited by examiner

*Primary Examiner* — Andrew J. Oyer

(57) ABSTRACT

The present invention relates to a non-halogen flame retardant resin composition. More particularly, the present invention provides a non-halogen flame retardant resin composition capable of simultaneously exhibiting superior flame retardancy, whiteness, and gloss by addressing problems of a flame retardant resin such as difficulties in realizing V-1 grade or higher flame retardancy when a non-halogen flame retardant is used and poor colorability due to low gloss and whiteness.

18 Claims, No Drawings

NON-HALOGEN FLAME RETARDANT RESIN COMPOSITION

CROSS-REFERENCE TO RELATED APPLICATIONS

This application is a U.S. National Stage of PCT/KR2017/011883 filed Oct. 26, 2017, which claims the priority benefit of Korean Patent Application No. 10-2016-0149369, filed on Nov. 10, 2016, and Korean Patent Application No. 10-2017-0107355, filed on Aug. 24, 2017, in the Korean Intellectual Property Office, the disclosures of which are incorporated herein by reference.

TECHNICAL FIELD

The present invention relates to a non-halogen flame retardant resin composition. More particularly, the present invention relates to a non-halogen flame retardant resin composition capable of simultaneously exhibiting superior flame retardancy, whiteness, and gloss by addressing problems of a flame retardant resin such as difficulties in realizing V-1 grade or higher flame retardancy when a non-halogen flame retardant is used and poor colorability due to low gloss and whiteness.

BACKGROUND ART

Flame resistance is required in various plastic products in the industry. As representative examples, flame retardancy is required in acrylonitrile-butadiene-styrene based copolymers, styrene-acrylonitrile based copolymers, polystyrene, polyphenylene oxide, and the like.

Thereamong, an acrylonitrile-butadiene-styrene based copolymer has difficulty in realizing V-1 grade or higher flame retardancy when a non-halogen flame retardant is used. In addition, when an acrylonitrile-butadiene-styrene based copolymer is mixed with polyphenylene oxide or the like to realize flame retardancy, whiteness is decreased, thereby exhibiting poor colorability.

In addition, when polystyrene, polyphenylene oxide, and the like are used to exhibit non-halogen flame retardancy, both gloss and whiteness are deteriorated.

Accordingly, there is a need for a resin composition capable of providing excellent gloss and whiteness with superior flame retardancy when a non-halogen flame retardant is used.

RELATED ART DOCUMENT

[Patent Document] KR 10-2013-0132004 A

DISCLOSURE

Technical Problem

Therefore, the present invention has been made in view of the above problems, and it is one object of the present invention to provide a non-halogen flame retardant resin composition capable of simultaneously exhibiting superior flame retardancy, whiteness, and gloss by addressing problems of a flame retardant resin such as difficulties in realizing V-1 grade or higher flame retardancy when a non-halogen flame retardant is used and poor colorability due to low gloss and whiteness.

The above and other objects can be accomplished by the present disclosure described below.

Technical Solution

In accordance with one aspect of the present invention, provided is a non-halogen flame retardant resin composition, including:
(A) a blended resin including a poly(arylene ether)-based polymer, a styrene-based polymer, and a vinyl cyan compound-conjugated diene compound-vinyl aromatic compound copolymer; and (B) a non-halogen flame retardant,
wherein the vinyl cyan compound is included in an amount of 1% by weight or more and less than 25% by weight based on a total weight of the vinyl cyan compound-conjugated diene compound-vinyl aromatic compound copolymer, a specimen manufactured by extruding and injection-molding the non-halogen flame retardant resin composition has a surface gloss degree of 80 or more at 45°, and the specimen manufactured without separate addition of a colorant has a whiteness (L value) of 75 or more, measured using CIELAB.

In accordance with another aspect of the present invention, provided is a non-halogen flame retardant resin composition, including: (A) a blended resin including 14 to 64% by weight of the poly(arylene ether)-based polymer, 20 to 70% by weight of the styrene-based polymer and 16 to 40% by weight of the vinyl cyan compound-conjugated diene compound-vinyl aromatic compound copolymer; and (B) a non-halogen flame retardant,
wherein the vinyl cyan compound is included in an amount of 1% by weight or more and less than 25% by weight based on a total weight of the vinyl cyan compound-conjugated diene compound-vinyl aromatic compound copolymer.

Advantageous Effects

As apparent from the fore-going, the present invention provides a molded article capable of simultaneously exhibiting superior flame retardancy, whiteness, and gloss by addressing problems of a flame retardant resin such as difficulties in realizing V-1 grade or higher flame retardancy when a non-halogen flame retardant is used and poor colorability due to low gloss and whiteness.

BEST MODE

Hereinafter, the present invention is described in detail.

A non-halogen flame retardant resin composition of the present disclosure includes (A) a blended resin including a poly(arylene ether)-based polymer, a styrene-based polymer, and a vinyl cyan compound-conjugated diene compound-vinyl aromatic compound copolymer; and (B) a non-halogen flame retardant, wherein the vinyl cyan compound is included in an amount of 1% by weight or more and less than 25% by weight based on a total weight of the vinyl cyan compound-conjugated diene compound-vinyl aromatic compound copolymer, a specimen manufactured by extruding and injection-molding the non-halogen flame retardant resin composition has a surface gloss degree of 80 or more at 45°, and the specimen manufactured without separate addition of a colorant has a whiteness (L value) of 75 or more, measured using CIELAB.

In another embodiment, the non-halogen flame retardant resin composition of the present disclosure includes (A) a blended resin including 14 to 64% by weight of the poly (arylene ether)-based polymer, 20 to 70% by weight of the styrene-based polymer and 16 to 40% by weight of the vinyl cyan compound-conjugated diene compound-vinyl aromatic compound copolymer; and (B) a non-halogen flame retardant, wherein the vinyl cyan compound is included in an amount of 1% by weight or more and less than 25% by weight based on a total weight of the vinyl cyan compound-conjugated diene compound-vinyl aromatic compound copolymer.

In the present disclosure, "non-halogen flame retardant resin composition" refers to a composition to which a halogen or a halogen compound is not separately added. However, the non-halogen flame retardant resin composition does not refer to a composition free from halogen introduced from the environment, air, or the like or trace amounts of impurities. In particular, the non-halogen flame retardant resin composition refers to a composition having a halogen content of 5,000 ppm or less, preferably 1,000 ppm or less.

The poly(arylene ether)-based polymer is not specifically limited so long as it may be used as a flame retardant resin. For example, the poly(arylene ether)-based polymer may be a homopolymer of a compound represented by Formula 1 or 2 below or a copolymer including a compound of Formula 1 or 2 below:

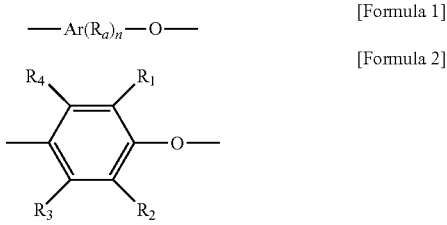

[Formula 1]

[Formula 2]

wherein $R_a$, $R_1$, $R_2$, $R_3$ and $R_4$ are substituents of an arylene group (Ar) or a phenylene group and are each independently or simultaneously hydrogen, chlorine, bromine, iodine, methyl, ethyl, propyl, allyl, phenyl, methylbenzyl, chloromethyl, bromomethyl, cyanoethyl, cyano, methoxy, phenoxy, or a nitro group, n is an integer of 4 to 20, and Ar is an arylene group having 7 to 20 carbon atoms. In an embodiment, $R_1$ and $R_2$ may be an alkyl group or a C1 to C4 alkyl group, and $R_3$ and $R_4$ may be hydrogen.

The poly(arylene ether)-based polymer may be, for example, a poly(phenylene ether)-based resin.

The poly(phenylene ether)-based resin refers to a poly (arylene ether) resin capable of being represented by [Formula 3] below:

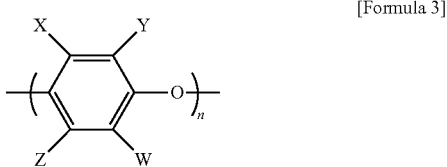

[Formula 3]

wherein each of W, X, Y, and Z are hydrogen or a substituent, and n is a repeat unit.

W, X, Y, and Z are each independently or simultaneously hydrogen, chlorine, bromine, iodine, methyl, ethyl, propyl, allyl, phenyl, methylbenzyl, chloromethyl, bromomethyl, cyanoethyl, cyano, methoxy, phenoxy, or a nitro group, and n is an integer of 4 to 20.

The homopolymer of the poly(arylene ether) resin is not specifically limited and, as a particular example, may be one or more selected from the group consisting of poly(2,6-dimethyl-1,4-phenylene) ether, poly(2,6-diethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dimethoxy-1,4-phenylene) ether, poly(2,6-dichloromethyl-1,4-phenylene) ether, poly(2,6-dibromomethyl-1,4-phenylene) ether, poly (2,6-diphenyl-1,4-phenylene) ether, and poly(2,5-dimethyl-1,4-phenylene) ether.

In addition, the copolymer of the poly(arylene ether) resin is not specifically limited and, as a particular example, may be one or more selected from the group consisting of a copolymer of 2,6-dimethylphenol and 2,3,6-trimethylphenol, a copolymer of 2,6-dimethylphenol and o-cresol, and a copolymer of 2,3,6-trimethylphenol and o-cresol.

The poly(arylene ether) resin may be included, for example, in an amount of 14 to 64% by weight, 20 to 50% by weight, or 30 to 40% by weight based on a total weight of the resin composition according to the present invention. Within this range, superior impact strength, mechanical properties, surface gloss, and whiteness are provided.

The poly(arylene ether) resin may have, for example, a weight average molecular weight of 5,000 to 100,000 g/mol, 20,000 to 80,000 g/mol, or 50,000 to 75,000 g/mol. Within this range, excellent dimensional stability and property balance are provided.

The styrene-based polymer is not specifically limited so long as it may be used as a flame retardant resin. For example, the styrene-based polymer may be a polystyrene resin having a weight average molecular weight of 10,000 to 300,000 g/mol and a styrene content of 93 to 100% by weight, or a polystyrene resin having a weight average molecular weight of 20,000 to 300,000 g/mol and a styrene content of 95 to 100% by weight.

The vinyl cyan compound-conjugated diene compound-vinyl aromatic compound copolymer is not specifically limited so long as it may be used as a flame retardant resin. For example, the vinyl cyan compound-conjugated diene compound-vinyl aromatic compound copolymer may be a graft copolymer having a seed-shell structure including a conjugated diene-based rubbery polymer; and a shell enclosing the rubbery polymer and prepared by polymerizing a vinyl aromatic compound, a vinyl cyan compound, and a fatty acid or a metal salt thereof, or a powder thereof.

The conjugated diene-based rubbery polymer may be prepared, for example, by polymerizing one or more conjugated diene-based compounds selected from the group consisting of 1,3-butadiene, 2,3-dimethyl-1,3-butadiene, 2-ethyl-1,3-butadiene, 1,3-pentadiene, and isoprene.

The conjugated diene-based rubbery polymer (hereinafter referred to as "seed") may be prepared, for example, by emulsion polymerization. In this case, superior mechanical properties are provided. An emulsion polymerization method is not specifically limited so long as it is a general method. As another example, the seed may have a latex form wherein a polymerized rubbery polymer is dispersed in water in a colloidal state.

In the present disclosure, "average particle diameter" is measured as an intensity value in a Gaussian mode using a dynamic laser light scattering method by means of a Nicomp 370HPL manufactured by Nicomp, US.

In the present disclosure, to find a gel content, a polybutadiene rubber latex was solidified using a dilute acid or a metal salt, followed by washing. This washed polybutadiene rubber latex was dried for 24 hours in a 60° C. vacuum oven.

An obtained rubber lump was cut into small pieces with scissors. Subsequently, 1 g of a rubber piece was placed in 100 g of toluene and stored for 48 hours in a dark room at room temperature, followed by separating into a sol and gel. The resultant sol and gel were respectively dried. Subsequently, a gel content was measured according to the following equation:

$$\text{Gel content (\% by weight)} = \frac{\text{Weight of insoluble matter (gel)}}{\text{Weight of sample}} \times 100$$

The seed may be one or more selected from bimodal seeds including a large-diameter seed having, for example, an average particle diameter of greater than 2,000 Å and 3,500 Å or less, 2,500 Å or more to 3,500 Å or less, or 3,000 Å or more to 3,500 Å or less, and a gel content of 60 to 95% by weight, 65 to 80% by weight, or 65 to 75% by weight and a small-diameter seed having, for example, an average particle diameter of 500 Å to 2,000 Å, 1,000 Å to 2,000 Å, or 1,000 Å to 1,500 Å and a gel content of 60 to 95% by weight, 70 to 95% by weight, or 80 to 95% by weight. Within this range, superior impact strength and mechanical properties are provided.

A weight ratio of the large-diameter seed to the small-diameter seed constituting the seed may be, for example, 50:50 to 90:10, 60:40 to 75:25, 60:40 to 70:30, or 70:30 to 75:25. Within this range, superior dispersion and surface characteristics are provided.

The seed may be included, for example, in an amount of 40 to 60% by weight, 50 to 60% by weight, or 53 to 57% by weight based on 100% by weight of a total of the conjugated diene-based rubbery polymer, the aromatic vinyl compound, and the vinyl cyan compound. Within this range, superior mechanical properties and surface characteristics are provided.

The shell encloses the bimodal seed and is prepared by emulsion-graft-polymerizing a fatty acid having an average carbon number and an average molecular weight or a metal salt thereof. For example, the sell may be included in an amount of 40 to 60% by weight, 40 to 50% by weight, or 43 to 47% by weight based on 100% by weight of a total of the conjugated diene-based rubbery polymer, the aromatic vinyl compound, and the vinyl cyan compound. Within this range, superior mechanical properties and property balance are provided.

The aromatic vinyl compound may be, for example, one or more selected from the group consisting of styrene, α-methyl styrene, α-ethyl styrene, p-methyl styrene, o-methyl styrene, o-t-butyl styrene, bromostyrene, chlorostyrene, trichlorostyrene, and derivatives thereof, and the vinyl cyan compound may be, for example, one or more selected from the group consisting of acrylonitrile, methacrylonitrile, ethacrylonitrile, and derivatives thereof.

In the present disclosure, the expression "derivative" may refer to a compound, one or more hydrogen atoms of which are substituted with a halogen group, an alkyl group, or a hydroxyl group.

The vinyl cyan compound is preferably included in an amount of 1% by weight or more and less than 25% by weight, 1% by weight to 20% by weight, 1% by weight to 15% by weight, 1% by weight to 12% by weight, 1 to 10% by weight, or 3 to 7% by weight based on a total weight of the copolymer. Within this range, superior mechanical properties and property balance are provided. The aromatic vinyl compound and the vinyl cyan compound included in the shell may be included, for example, in a weight ratio of 90:10 to 99:1.

The fatty acid may be, for example, two or more, two to ten, or two to five fatty acid dimer types having different carbon atom number chains or a mixture including a metal salt thereof. An average carbon atom number of a chain of the fatty acid may be, for example, 10 or more, 33 or more, 33 to 44, or 33 to 36. Within this range, thermal stability is superior, thereby reducing an amount of gas generated during extrusion and injection-molding.

The fatty acid may include, for example, an unsaturated fatty acid dimer having an unsaturation degree of 1 to 20, 1 to 10, or 1 to 5. Within this range, an amount of volatilized substances is small during extrusion and injection-molding.

In the present disclosure, the expression "unsaturation degree" refers to the number of double bonds.

The fatty acid may have, for example, a molecular weight of 100 g/mol or more, 100 to 2,000 g/mol, or 100 to 1,000 g/mol. Within this range, thermal stability is superior, thereby reducing a gas generation amount during extrusion and injection-molding.

Here, the expression "molecular weight" refers to a weight average molecular weight measured by gel permeation chromatography (GPC).

The fatty acid may include, for example, one or more selected from the group consisting of oleic acid, an oleic acid-based dimer, myristoleic acid, linoleic acid, and a metal salt thereof.

A metal of the metal salt is, for example, an alkali metal or an alkaline earth metal. Preferably, the metal is an alkaline earth metal. As a particular example, the metal may be calcium, magnesium, or a mixture thereof.

The fatty acid may be included, for example, in an amount of 0.1 to 3 parts by weight, 0.1 to 2 parts by weight, 0.1 to 1 part by weight, or 0.1 to 0.3 parts by weight based on 100 parts by weight of a total content of the conjugated diene-based rubbery polymer, the aromatic vinyl compound, and the vinyl cyan compound.

The vinyl cyan compound-conjugated diene compound-vinyl aromatic compound copolymer of the present invention may have, for example, a weight average molecular weight of 20,000 to 100,000 g/mol, 30,000 g/mol to 85,000 g/mol, or 30,000 to 70,000 g/mol. Within this range, surface gloss, whiteness, and dispersion are superior and mechanical properties are excellent.

Here, "weight average molecular weight" refers to a molecular weight measured by gel permeation chromatography (GPC).

The vinyl cyan compound-conjugated diene compound-vinyl aromatic compound copolymer may be, as a particular example, a graft copolymer including 45 to 60% by weight of a conjugated diene rubbery polymer, 1 to 10% by weight of a vinyl cyan compound (substituted or combined with an alkyl (meth) acrylate compound as needed), and 30 to 54% by weight of a vinyl aromatic compound.

The vinyl cyan compound-conjugated diene compound-vinyl aromatic compound copolymer may be, as another example, a graft copolymer including 50 to 60% by weight of a conjugated diene rubbery polymer, 2 to 8% by weight of a vinyl cyan compound (substituted or combined with an alkyl (meth) acrylate compound as needed), and 32 to 48% by weight of a vinyl aromatic compound.

The vinyl cyan compound-conjugated diene compound-vinyl aromatic compound copolymer is preferably used in a powder form (dry powder) coagulated using a salt, In this case, pyrolysis stability is superior, thereby reducing an amount of gas generated during extrusion and injection-molding.

The salt may be, for example, a sulfate, a carbonate, or a mixture thereof.

The vinyl cyan compound-conjugated diene compound-vinyl aromatic compound copolymer of the present invention has a composition capable of improving graft density, thereby increasing dispersion of a poly(arylene ether)-based polymer and a styrene-based polymer. Accordingly, high gloss is exhibited.

For example, the blended resin may include 14 to 64% by weight of the poly(arylene ether)-based polymer, 20 to 70% by weight of the styrene-based polymer, and 16 to 40% by weight of the vinyl cyan compound-conjugated diene compound-vinyl aromatic compound copolymer. Within this range, whiteness and gloss may be more effectively improved even while using a flame retardant resin.

As a particular example, the blended resin may include 20 to 50% by weight of the poly(arylene ether)-based polymer, 30 to 50% by weight of the styrene-based polymer, and 20 to 30% by weight of the vinyl cyan compound-conjugated diene compound-vinyl aromatic compound copolymer. Within this range, whiteness and gloss may be more effectively improved even while using a flame retardant resin.

As another example, the blended resin may include 20 to 40% by weight of the poly(arylene ether)-based polymer, 35 to 50% by weight of the styrene-based polymer, and 22 to 30% by weight of the vinyl cyan compound-conjugated diene compound-vinyl aromatic compound copolymer.

A method of preparing the vinyl cyan compound-conjugated diene compound-vinyl aromatic compound copolymer of the present invention is not specifically limited and may include, for example, a step of polymerizing a seed; and a step of preparing a shell by emulsion-graft-polymerizing the seed with a fatty acid having a chain of 10 or more carbon atoms on average and a molecular weight of 500 to 2,000 g/mol or a metal salt thereof.

The seed may include, for example, one or more of a large-diameter rubbery polymer having an average particle diameter of greater than 2,000 Å and 3,500 Å or less and a small-diameter rubbery polymer having an average particle diameter of 500 Å to 2,000 Å.

The seed polymerization, for example, may be performed through emulsion polymerization.

The seed polymerization and the emulsion graft polymerization are not specifically limited so long as they are methods generally used to prepare an ABS resin.

In an embodiment, in the method of preparing the vinyl cyan compound-conjugated diene compound-vinyl aromatic compound copolymer of the present invention, one or more selected from the group consisting of alkyl aryl sulfonate, alkali methyl alkyl sulfate, sulfonated alkyl ester, and a metal salt of unsaturated fatty acid may be additionally included in an amount of 0.01 to 3 parts by weight, 0.05 to 1 part by weight, or 0.05 to 0.5 parts by weight based on 100 parts by weight of the monomers (vinyl cyan+conjugated diene+aromatic vinyl).

In the method of preparing the vinyl cyan compound-conjugated diene compound-vinyl aromatic compound copolymer of the present invention, a water-soluble initiator or a liposoluble initiator may be used an initiator. Here, the water-soluble initiator includes, for example, sodium persulfate, potassium persulfate, ammonium persulfate, and the like, and the liposoluble initiator includes cumene hydroperoxide, diisopropyl benzene hydroperoxide, tertiary butyl hydroperoxide, paramenthane hydroperoxide, benzoyl peroxide, and the like. As needed, a combination of the water-soluble initiator and the liposoluble initiator may be used.

The initiator may be used, for example, in an amount of 0.01 to 2 parts by weight, 0.05 to 1 part by weight, or 0.05 to 0.5 parts by weight. Within this range, excessive reaction does not occur and a polymer having a desired particle diameter and size distribution may be produced.

In the method of preparing the vinyl cyan compound-conjugated diene compound-vinyl aromatic compound copolymer of the present invention, one or more selected from the group consisting of, for example, sodium formaldehyde sulfoxylate, sodium ethylene diamine tetraacetate, ferrous sulfate, dextrose, pyrrole sodium phosphate, and sodium sulfite may be included as an oxidation-reduction catalyst.

The oxidation-reduction catalyst may be used, for example, in an amount of 0.001 to 0.4 parts by weight, 0.005 to 0.2 parts by weight, or 0.01 to 0.2 parts by weight based on 100 parts by weight of the monomers. Within this range, polymerization is facilitated, thereby rapidly producing the vinyl cyan compound-conjugated diene compound-vinyl aromatic compound copolymer.

In the step of emulsion-graft-polymerizing the shell, the emulsion graft polymerization is preferably performed at 60 to 90° C. or 60 to 80° C. for 3 to 5 hours or 2 to 4 hours after adding the reactants. Within this range, the initiator is activated, whereby polymerization is initiated and heat removal is easy. In addition, when temperature and reaction time are controlled within the range, a polymer having uniform size distribution may be produced.

The step of emulsion-graft-polymerizing the shell may further include 0.1 to 1 part by weight, 0.2 to 0.6 parts by weight, or 0.3 to 0.5 parts by weight of a molecular weight regulator, as needed, based on 100 parts by weight of the monomers. When the molecular weight regulator is included within this range, a polymer having a desired average particle diameter may be advantageously formed and a polymer having a uniform size is provided.

As the molecular weight regulator, for example, a mercaptan-based compound, such as tertiary dodecyl mercaptan, may be used.

In another embodiment of the present invention, the initiator and the oxidation-reduction catalyst used in the graft polymerization may be added batchwise at an initial reaction stage. However, when the initiator and the oxidation-reduction catalyst are split-added as described above, reaction heat may be easily removed, and a content of unreacted monomers may be reduced while preventing side reactions, thereby improving quality and productivity of a resultant polymer.

After completing the addition, temperature is elevated up to 60 to 100° C., or 70 to 90° C. at a temperature elevation rate of 5 to 30° C./hr, or 10 to 20° C./hr, thereby performing second graft polymerization. When reaction temperature is elevated within this range, reaction of unreacted monomers is facilitated, thereby rapidly accomplishing a high conversion rate.

The polymerization is preferably terminated, for example, when a polymerization conversion rate is 90 to 99%, 95 to 99% or 97 to 99%. Within this range, a content of unreacted monomers in a product is low and a polymer having a high polymerization degree may be produced.

In the present disclosure, "polymerization conversion rate" may be measured by a general method used in the technical art to which the present invention pertains. For example, a polymerization conversion rate may be measured by a weight loss method. As a particular example, a polymerization conversion rate is calculated according to the following mathematical equation after drying 1.5 g of a graft copolymer latex in a 150° C. hot air dryer for 15 minutes and measuring a weight of the dried graft copolymer latex to find a total solid content (TSC):

$$\text{Polymerization conversion rate (\%)} = \frac{TSC \times (M + W + S)}{100} - S$$

TSC: Total solid content (%)
M: Content of total of added monomers (parts by weight)
W: Content of added water (parts by weight)
S: Content of added emulsifier and other supplementary materials (parts by weight)

Other reaction conditions, such as graft rate and reaction pressure, other than the aforementioned conditions, are not specifically limited so long as they have generally been performed in the technical art to which the present invention pertains, and may be properly selected and used as needed.

The graft copolymer latex according to the present invention may be prepared into a powder form through general processes such as the aforementioned salt coagulation, washing, and drying. The resultant powder-type graft copolymer latex is mixed with a non-polar resin, such as a poly(arylene ether)-based polymer or a styrene-based resin, and then is subjected to extrusion and injection-molding, thereby being prepared into a molded article.

The non-halogen flame retardant resin composition is, for example, a composition capable of improving both gloss and whiteness when the blended resin including a non-halogen flame retardant is used, and is characterized by using a combination of a metal salt-free hypophosphite compound and an organic flame retardant as the non-halogen flame retardant.

The non-halogen flame retardant may be used, for example, in an amount of 15 to 45 parts by weight, 15 to 31 parts by weight, 15 to 30 parts by weight, or 20 to 30 parts by weight based on 100 parts by weight of the blended resin. Within this range, superior flame retardancy and yellowing resistance are provided.

The non-halogen flame retardant resin composition may include, for example, 0.1 to 5 parts by weight, 1 to 5 parts by weight, or 1 to 3 parts by weight of the metal salt-free hypophosphite compound based on 100 parts by weight of the blended resin. Within this range, whiteness and gloss are significantly improved while realizing a flame retardancy grade of a V-1 or higher.

The metal salt-free hypophosphite compound may be any compound used as a stabilizer or a flame retardant aid of an amorphous flame retardant resin. Preferably, the metal salt-free hypophosphite compound is a compound including phosphine oxide.

The metal salt-free hypophosphite compound may be, for example, a compound represented by [Formula 4] below:

[Formula 4]

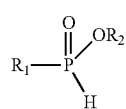

wherein $R_1$ and $R_2$ may be each independently a hydrogen atom, an alkyl group, a cycloalkane group, an alkoxy group, an aryl group, chlorine, bromine, iodine, a methylbenzyl group, a chloromethyl group, a bromomethyl group, a cyanoethyl group, a cyano group, a phenoxy group, or a nitro group.

The alkyl group may be a C1 to C10 alkyl group, a methyl group, an ethyl group, or a propyl group, the alkoxy group may be a C1 to C20, C1 to C16, or C1 to C12 alkoxy group, particularly methoxy or ethoxy, the aryl group may be a C6 to C24 aryl group, a phenyl group, a naphthyl group, a phenanthrenyl group, a fluorene group, a dimethylfluorene group, a triphenylene group, a benzochrysene group, or a fluoranthene group, and the cycloalkane group may be a C3 to C30 or C3 to C18 cycloalkane group.

As a particular example, the metal salt-free hypophosphite compound may be one or more selected from the group consisting of H-phosphinic acid, oxaphosphorine oxide, (3-chloropropyl)phosphinic acid, methyl cyclohexylphosphinate, butyl phenylphosphinate, and derivatives thereof.

[99] The non-halogen flame retardant resin composition may include, for example, 15 to 40 parts by weight, 15 to 30 parts by weight, or 15 to 25 parts by weight of the organic phosphorus flame retardant based on 100 parts by weight of the blended resin. Within this range, whiteness and gloss may be efficiently improved while realizing a flame retardancy grade of a V-1 or higher.

The organic phosphorus flame retardant may be any used as a flame retardant for an amorphous flame retardant resin. Preferably, the organic phosphorus flame retardant may be a compound selected from among a C1 to C20 alkyl phosphonate ester, a C6 to C30 aryl phosphonate ester, a C1 to C10 trialkyl phosphine, a C1 to C20 alkyl phosphine oxide, and a C6 to C20 arylphosphine oxide.

When the organic phosphorus flame retardant is used along with the metal salt-free hypophosphite compound, the organic phosphorus flame retardant is more preferably one or more selected from the group consisting of triphenyl phosphate, resorcinol tetraphenyl-di-phosphate, bisphenol-A tetraphenoxy-di-phosphate, bisphenol-A tetracresyl-di-phosphate, and resorcinol tetraxylyloxy-di-phosphate.

The non-halogen flame retardant resin composition may include, for example, any used as an anti-dripping agent for an amorphous flame retardant resin. Preferably, a fluoropolymer may be used.

The fluoropolymer may be, for example, Teflon, polyamide, polysilicon, PTFE, a TFE-HFP copolymer, or the like. Considering kneading and dispersion effects, a polymer having a particle size of 0.1 to 10 μm is more preferred.

The fluoropolymer may be included, for example, in an amount of 2 parts by weight or less, 0.001 to 1 part by weight, or 0.01 to 1 part by weight based on 100 parts by weight of the blended resin. Within this range, anti-dripping effect of the flame retardant resin additive (B) may be optimized.

The non-halogen flame retardant resin composition may include, for example, any used as a melt index improver for an amorphous flame retardant resin. For example, a lubricant, such as magnesium stearate or a wax, may be used. Preferably, a wax is used.

The wax is a compound having good compatibility with a flame retardant resin and very low viscosity at high temperature. For example, the wax has a melt viscosity of several tens to several hundred g/10 minutes. For example, a paraffin wax, a polyethylene wax, or the like may be used. When the wax is used in a proper amount, inherent properties of the flame retardant resin may be maintained and a melt index may be lowered at relatively low cost.

The lubricant may be included, for example, in an amount of 0.5 to 5 parts by weight based on 100 parts by weight of the blended resin. Within this range, melt index improvement effect is excellent and inherent properties of the flame retardant resin may be maintained.

The non-halogen flame retardant resin composition may further include one or more selected from among a heat stabilizer, a UV stabilizer, a lubricant such as metal stearate, a processing aid, a pigment, a colorant, a molding aid, and a filler.

The additives may be used, for example, in an amount of 0.05 to 5 parts by weight, 0.05 to 1 part by weight, or 0.05 to 0.8 parts by weight based on 100 parts by weight of the blended resin.

A specimen manufactured by melt-extruding the non-halogen flame retardant resin composition of the present invention may have a high surface gloss degree of 80 or more, greater than 91, or 99 or more at 45°.

The specimen may have an improved whiteness (L value) of 75 or more, 84 or more, or 84 to 85, measured using CIELAB.

The specimen is produced into a pellet by injection-molding or extruding the non-halogen flame retardant resin composition at a process temperature of 250 to 300° C., followed by injection-molding and mold processing.

When the specimen is allowed to stand for 100 hours in a 90° C. oven, the specimen may exhibit a yellow index (Δb) of 20 or less or 19 or less. Here, the yellow index (Δb) indicates yellowing resistance and represents an increase in b value measured using a HunterLab colorimeter.

The non-halogen flame retardant resin composition may have, for example, a flame retardancy (UL-94, 2 mm) of V-0, V-1, or V-2. Within this range, flame retardancy is superior and property balance is excellent.

The non-halogen flame retardant resin composition may have, for example, an Izod impact strength (¼") of 10 kgf·m/m or more, 12 kgf·m/m or more, or 12 to 20 kgf·m/m, measured according to ASTM D256. Within this range, impact strength is superior and property balance is excellent.

Since the non-halogen flame retardant resin composition of the present invention has superior mechanical strength and excellent whiteness and gloss, it is expected to be suitable as a substitute for conventional blended materials.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Preparation Example

Ingredients used in an experiment were prepared as follows:

1) SB: 55% by weight of polybutadiene rubber was graft-polymerized with 45% by weight of a styrene monomer, and then coagulated with sulfate, thereby being prepared in a powder form. Here, as an emulsifier, an oleic acid dimer having 36 carbon atoms and an unsaturation degree of 1 was used.

2) ABS (AN5%): 0.01 parts by weight of rosin soap were added based on 100 parts by weight of a mixture including 55% by weight of polybutadiene rubber, 40% by weight of a styrene monomer, and 5% by weight of acrylonitrile and then graft polymerization was performed, followed by coagulating with sulfate. As a result, powder-type ABS (AN5%) was prepared. Here, as an emulsifier, an oleic acid dimer having 36 carbon atoms and an unsaturation degree of 1 was used.

3) ABS (AN12%): 0.01 parts by weight of rosin soap were added based on 100 parts by weight of a mixture including 55% by weight of polybutadiene rubber, 33% by weight of a styrene monomer, and 12% by weight of acrylonitrile and then graft polymerization was performed, followed by coagulating with sulfate. As a result, powder-type ABS (AN12%) was prepared. Here, as an emulsifier, an oleic acid dimer having 36 carbon atoms and an unsaturation degree of 1 was used.

4) ABS (AN25%): 0.01 parts by weight of rosin soap were added based on 100 parts by weight of a mixture including 55% by weight of polybutadiene rubber, 20% by weight of a styrene monomer, and 25% by weight of acrylonitrile and then graft polymerization was performed, followed by coagulating with sulfate. As a result, powder-type ABS (AN25%) was prepared. Here, as an emulsifier, an oleic acid dimer having 36 carbon atoms and an unsaturation degree of 1 was used.

5) ABS (AN5%) excluding fatty acid or metal salt thereof: 55% by weight of polybutadiene rubber was graft-polymerized with 40% by weight of a styrene monomer and 5% by weight of acrylonitrile without addition of fatty acid or a metal salt thereof, followed by coagulating with sulfate. As a result, the ABS (AN5%) excluding fatty acid or a metal salt thereof was prepared in powder form. Here, as an emulsifier, an oleic acid dimer having 36 carbon atoms and an unsaturation degree of 1 was used.

6) PS: A general-purpose polystyrene resin having a weight average molecular weight of 250,000 g/mol and a rubber content of 0% by weight was prepared.

7) HIPS: A high-impact polystyrene resin that is reinforced with impact resistance and has a weight average molecular weight of 200,000 g/mol and a rubber content of 8% by weight was prepared.

8) SAN: A polymer was prepared by bulk-polymerizing 75% by weight of a styrene monomer and 25% by weight of an acrylonitrile monomer.

9) mPPO: A phenylene oxide copolymer that is represented by Formula 2 and has a number average molecular weight of 24,000 g/mol was prepared.

10) Flame retardant 1: Phosphate compound: bisphenol A bis(diphenyl phosphate) (CAS No. 181028-79-5)

11) Flame retardant 2: Metal salt-free hypophosphite compound: Methyl cyclohexylphosphinate 12) Flame retardant 3: Metal salt-including hypophosphite compound: Calcium hypophosphite salt 13) Lubricant: Magnesium stearate (CAS No. 557-04-0)

14) Stabilizer: Irganox 1010 (CAS No. 6683-19-8)

15) Anti-dripping agent: Fluorine-based compound/Teflon

Examples 1-5, Comparative Examples 1-9, and Additional Examples 1 to 4

Ingredients were mixed as summarized in Tables 1 and 2 below and extruded at a process temperature of 200 to 250° C., thereby being manufactured into a pellet.

The extruded pellet was manufactured into a specimen conforming to ASTM standards for measuring surface gloss/impact strength and the UL standard for measuring flame retardancy at a process temperature of 250 to 300° C. by means of an injection machine.

TABLE 1

| Classification | Examples | | | | | Comparative Examples | | | |
|---|---|---|---|---|---|---|---|---|---|
| | 1 | 2 | 3 | 4 | 5 | 1 | 2 | 3 | 4 |
| 1) SB(AN0%) | | | | | | 25 | | | |
| 2) ABS (AN5%) | 25 | 25 | 30 | | | | | | |
| 3) ABS (AN12%) | | | | 30 | 25 | | | | |
| 4) ABS (AN25%) | | | | | | | | 25 | 25 |
| 5) ABS excluding metal salt (AN5%) | | | | | | | 25 | | |
| 6) PS | 40 | 40 | 35 | 40 | 44 | 40 | | | 40 |
| 7) HIPS | | | | | | | 65 | | |
| 8) SAN (AN25%) | | | | | | | | 40 | |
| 9) mPPO | 35 | 35 | 35 | 30 | 31 | 35 | 35 | 35 | 35 |
| 10) Flame retardant 1 | 22 | 26 | 22 | 26 | 25 | 22 | 22 | 22 | 22 |
| 11) Flame retardant 2 | 2 | 2 | 1 | 0.5 | 4.5 | | | | 0.01 |
| 12) Flame retardant 3 | | | | | | | | | |
| 13) Lubricant | 0.5 | 0.5 | 0.5 | 0.5 | 0.5 | 0.5 | 0.5 | 0.5 | 0.5 |
| 14) Stabilizer | 0.5 | 0.5 | 0.5 | 0.5 | 0.5 | 0.5 | 0.5 | 0.5 | 0.5 |
| 15) Anti-dripping agent | 0.1 | 0.1 | 0.1 | 0.1 | 0 | 0.1 | 0.1 | 0.1 | 0.1 |

TABLE 2

| Classification | Comparative Examples | | | | | Additional Examples | | | |
|---|---|---|---|---|---|---|---|---|---|
| | 5 | 6 | 7 | 8 | 9 | 1 | 2 | 3 | 4 |
| 1) SB (AN0%) | | | | | | | | | |
| 2) ABS (AN5%) | 25 | | 5 | 5 | 25 | | | | |
| 3) ABS (AN12%) | | | | | | 25 | 25 | 25 | |
| 4) ABS (AN25%) | | 25 | 10 | 10 | | | | | |
| 5) ABS excluding metal salt (AN5%) | | | | | | | | | 25 |
| 6) PS | | 40 | 45 | 45 | 65 | 40 | 40 | 40 | 40 |
| 7) HIPS | | | | | | | | | |
| 8) SAN (AN25%) | 40 | | | | | | | | |
| 9) mPPO | 35 | 35 | 40 | 40 | 10 | 35 | 35 | 35 | 35 |
| 10) Flame retardant 1 | 22 | 22 | 22 | 12 | 22 | 22 | 22 | 50 | 22 |
| 11) Flame retardant 2 | | | 6 | 2 | 2 | 10 | | | 2 |
| 12) Flame retardant 3 | | 2 | | | | | | | |
| 13) Lubricant | 0.5 | 0.5 | 0.5 | 0.5 | 0.5 | 0.5 | | | 0.5 |
| 14) Stabilizer | 0.5 | 0.5 | 0.5 | 0.5 | 0.5 | 0.5 | | | 0.5 |
| 15) Anti-dripping agent | 0.1 | 0.1 | 0.1 | 0.1 | 0.1 | 0.1 | | | 0.1 |

<Property Tests>

Properties of the specimen according to each of Examples 1 to 5, Comparative Examples 1 to 9, and Additional Examples 1 to 4 were measured as follows.

Surface gloss degree (45°): Measured at 45° according to a stand measurement method, ASTM D523, using the specimen.

Flame retardancy: The specimen was processed to 2 mm thickness according to a UL-94 vertical method, and then a flame retardancy grade thereof was measured.

Impact strength (Notched Izod impact strength, kgf·m/m): Measured using a ¼" specimen according to a stand measurement method, ASTM D256.

Whiteness (resin colorability): A specimen having a thickness of ⅛ inch was subjected to a CIELAB test, and a chromaticity of an L value was measured.

L value means a value of a coordinate axis indicating intrinsic color and may range from 0 to 100. An L value of 0 represents black, and an L value of 100 represents white.

Yellow index (Δb): The specimen was allowed to stand in a 90° C. oven for 100 hours, and a discoloration degree thereof was measured using a HunterLab colorimeter.

Results obtained according to the methods are summarized in Tables 3 and 4.

TABLE 3

| Properties | Examples | | | | | Comparative Examples | | | |
|---|---|---|---|---|---|---|---|---|---|
| | 1 | 2 | 3 | 4 | 5 | 1 | 2 | 3 | 4 |
| Gloss | 99 | 99 | 99 | 99 | 99 | 73 | 11 | 73 | 95 |

TABLE 3-continued

|  | Examples | | | | | Comparative Examples | | | |
|---|---|---|---|---|---|---|---|---|---|
| Properties | 1 | 2 | 3 | 4 | 5 | 1 | 2 | 3 | 4 |
| degree |  |  |  |  |  |  |  |  |  |
| Flame retardancy | V-1 | V-0 | V-1 | V-1 | V-2 | V-1 | V-1 | NG | NG |
| Impact strength | 17 | 15 | 18 | 16 | 12 | 18 | 7 | 3 | 4 |
| Whiteness (L value) | 85 | 84 | 83 | 77 | 87 | 72 | 65 | 63 | 71 |
| Yellow index (Δb) | 16 | 18 | 19 | 14 | 13 | 18 | 14 | 13 | 14 |

TABLE 4

|  | Comparative Examples | | | | | Additional Examples | | | |
|---|---|---|---|---|---|---|---|---|---|
| Properties | 5 | 6 | 7 | 8 | 9 | 1 | 2 | 3 | 4 |
| Gloss degree | 91 | 77 | 82 | 80 | 99 | 99 | 100 | 100 | 99 |
| Flame retardancy | NG | NG | NG | NG | NG | V-1 | V-1 | V-1 | V-1 |
| Impact strength | 3 | 7 | 3 | 5 | 11 | 20 | 6 | 4 | 16 |
| Whiteness (L value) | 65 | 63 | 82 | 80 | 88 | 67 | 86 | 87 | 81 |
| Yellow index (Δb) | 15 | 17 | 14 | 14 | 11 | 10 | 24 | 25 | 24 |

As shown in Tables 3 and 4, it can be confirmed that the specimens of Examples 1 to 5 manufactured using the non-halogen flame retardant resin composition including the blended resin and the resin additives according to the present invention exhibit superior gloss, flame retardancy, impact strength, and whiteness, compared to the specimens of Comparative Examples 1 to 9 manufactured using a non-halogen flame retardant resin composition including a blended resin or resin additives not conforming to the present invention.

In addition, it can be confirmed that Examples 1 to 5 including the fatty acid or the metal salt thereof upon preparation of the ABS resin exhibit a yellow index of 20 or less, i.e., superior yellowing resistance, despite exclusion of a colorant, but Additional Example 1 excluding the metal salt upon preparation of the ABS resin exhibits poor yellow index.

As described above, the present invention is expected to address a problem of a flame retardant resin wherein it is difficult to realize V-1 grade or higher flame retardancy when a non-halogen flame retardant is used or colorability is poor due to low gloss and whiteness, and simultaneously exhibit superior flame retardancy, whiteness, gloss, and yellowing resistance, thereby effectively substituting for conventional blended materials.

The invention claimed is:

1. A non-halogen flame retardant resin composition, comprising: (A) a blended resin comprising a poly(arylene ether)-based polymer, a styrene-based polymer, and a vinyl cyan compound-conjugated diene compound-vinyl aromatic compound copolymer; and (B) a non-halogen flame retardant,
wherein the vinyl cyan compound is comprised in an amount of 1% by weight or more and less than 25% by weight based on a total weight of the vinyl cyan compound-conjugated diene compound-vinyl aromatic compound copolymer, and
a specimen manufactured by extruding and injection-molding the non-halogen flame retardant resin composition has a surface gloss degree of 80 or more at 45° and a whiteness (L value) of 75 or more, measured using CIELAB,
wherein the blended resin comprises 20 to 50% by weight of the poly(arylene ether)-based polymer, 30 to 50% by weight of the styrene-based polymer, and 20 to 30% by weight of the vinyl cyan compound-conjugated diene compound-vinyl aromatic compound copolymer,
wherein the non-halogen flame retardant resin composition comprises 0.1 to 4.5 parts by weight of a metal salt-free hypophosphite compound comprising phosphine oxide based on 100 parts by weight of the blended resin.

2. The non-halogen flame retardant resin composition according to claim 1, wherein the poly(arylene ether)-based polymer is a homopolymer having a unit represented by [Formula 1] or [Formula 2] below; or a copolymer comprising a unit represented by [Formula 1] or [Formula 2] below:

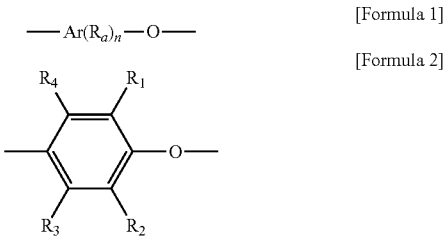

wherein $R_a$, $R_1$, $R_2$, $R_3$ and $R_4$ are substituents of an arylene group (Ar) or a phenylene group and are each independently or simultaneously hydrogen, chlorine, bromine, iodine, methyl, ethyl, propyl, allyl, phenyl, methylbenzyl, chloromethyl, bromomethyl, cyanoethyl, cyano, methoxy, phenoxy, or a nitro group, n is an integer of 4 to 20, and Ar is an arylene group having 7 to 20 carbon atoms.

3. The non-halogen flame retardant resin composition according to claim 1, wherein the poly(arylene ether)-based polymer is a poly(phenylene ether)-based polymer having a weight average molecular weight of 5,000 to 100,000 g/mol.

4. The non-halogen flame retardant resin composition according to claim 1, wherein the styrene-based polymer is a polystyrene resin having a weight average molecular weight of 10,000 to 300,000 g/mol and a styrene content of 93 to 100% by weight.

5. The non-halogen flame retardant resin composition according to claim 1, wherein the vinyl cyan compound-conjugated diene compound-vinyl aromatic compound copolymer is a graft copolymer having a seed-shell structure comprising a seed comprising a conjugated diene-based rubbery polymer; and a shell enclosing the seed and prepared by polymerizing a vinyl aromatic compound, a vinyl cyan compound, and fatty acid or a metal salt thereof.

6. The non-halogen flame retardant resin composition according to claim 5, wherein the conjugated diene-based rubbery polymer is prepared by polymerizing one or more conjugated diene-based compounds selected from the group consisting of 1,3-butadiene, 2,3-dimethyl-1,3-butadiene, 2-ethyl-1,3-butadiene, 1,3-pentadiene, and isoprene.

7. The non-halogen flame retardant resin composition according to claim 1, wherein the non-halogen flame retardant resin composition has a yellow index, Δb (90° C., 100 hours), 20 or less.

8. The non-halogen flame retardant resin composition according to claim 5, wherein the seed (a) is comprised in an amount of 40 to 60% by weight and the shell (b) is comprised in an amount of 40 to 60% by weight based on 100% by weight of a total of the conjugated diene-based rubbery polymer, the vinyl aromatic compound, and the vinyl cyan compound, wherein a weight ratio of the vinyl aromatic compound to the vinyl cyan compound comprised in the shell (b) is 90:10 to 99:1.

9. The non-halogen flame retardant resin composition according to claim 5, wherein the fatty acid or the metal salt thereof is a fatty acid having a chain comprising 10 or more carbon atoms, a metal salt thereof, or a mixture thereof.

10. The non-halogen flame retardant resin composition according to claim 5, wherein the fatty acid or the metal salt thereof comprises an unsaturated fatty acid having an unsaturation degree of 1 to 20 or a metal salt thereof.

11. The non-halogen flame retardant resin composition according to claim 5, wherein the fatty acid or the metal salt thereof is comprised in an amount of 0.1 to 3 parts by weight based on 100 parts by weight of a total of the conjugated diene-based rubbery polymer, the aromatic vinyl compound, and the vinyl cyan compound.

12. The non-halogen flame retardant resin composition according to claim 1, wherein the non-halogen flame retardant resin composition comprises 15 to 40 parts by weight of one or more organic phosphorus flame retardants selected from among C1 to C20 alkyl phosphonate ester, C6 to C30 aryl phosphonate ester, and C1 to C10 trialkyl phosphine based on 100 parts by weight of the blended resin.

13. The non-halogen flame retardant resin composition according to claim 1, wherein the non-halogen flame retardant further comprises an organic phosphorus flame retardant.

14. The non-halogen flame retardant resin composition according to claim 13, wherein the metal salt-free hypophosphite compound is a compound represented by [Formula 4] below:

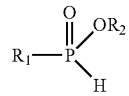

[Formula 4]

wherein $R_1$ and $R_2$ may be each independently a hydrogen atom, an alkyl group, a cycloalkane group, an alkoxy group, an aryl group, chlorine, bromine, iodine, a methylbenzyl group, a chloromethyl group, a bromomethyl group, a cyanoethyl group, a cyano group, a phenoxy group, or a nitro group.

15. The non-halogen flame retardant resin composition according to claim 1, wherein the non-halogen flame retardant resin composition comprises 2 parts by weight or less of a fluorine-based anti-dripping agent based on 100 parts by weight of the blended resin.

16. The non-halogen flame retardant resin composition according to claim 1, wherein the non-halogen flame retardant resin composition comprises 0.5 to 5 parts by weight of one or more selected from among a stabilizer, a lubricant, a processing aid, a pigment, a colorant, a molding aid, a wax, and a filler based on 100 parts by weight of the blended resin.

17. A non-halogen flame retardant resin composition, comprising: (A) a blended resin comprising 20 to 50% by weight of a poly(arylene ether)-based polymer, 30 to 50% by weight of a styrene-based polymer and 20 to 30% by weight of a vinyl cyan compound-conjugated diene compound-vinyl aromatic compound copolymer; and (B) a non-halogen flame retardant,
wherein the vinyl cyan compound is comprised in an amount of 1% by weight or more and less than 25% by weight based on a total weight of the vinyl cyan compound-conjugated diene compound-vinyl aromatic compound copolymer,
wherein the non-halogen flame retardant resin composition comprises 0.1 to 4.5 parts by weight of a metal salt-free hypophosphite compound comprising phosphine oxide based on 100 parts by weight of the blended resin.

18. The non-halogen flame retardant resin composition according to claim 1, wherein the vinyl cyan compound-conjugated diene compound-vinyl aromatic compound copolymer has a weight average molecular weight of 30,000 to 70,000 g/mol.

* * * * *